INVENTOR.
WILLIAM F. DEBOICE

BY Sidney Magnes

AGENT

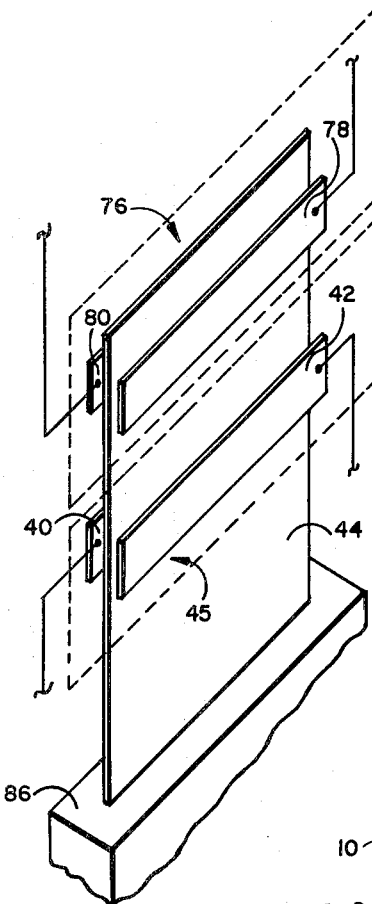
FIG. 4
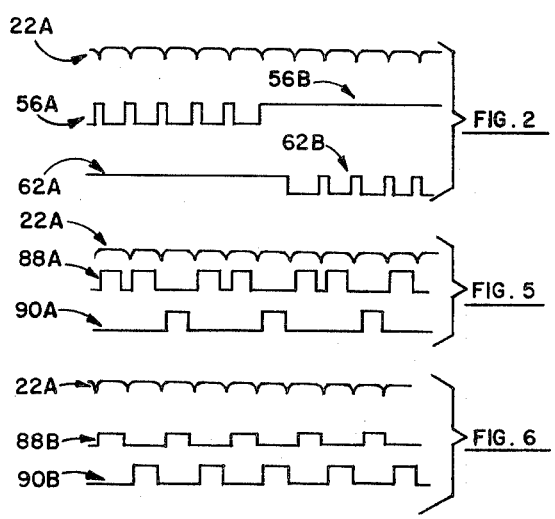
FIG. 2
FIG. 5
FIG. 6
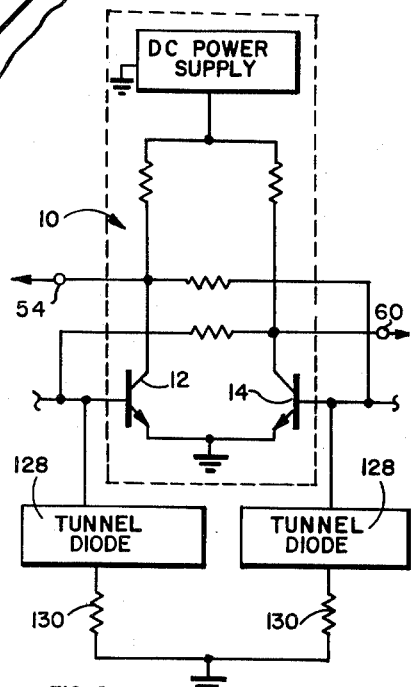
FIG. 8
INVENTOR.
WILLIAM F. DEBOICE
BY
*Sidney Magnes*
AGENT Jan. 4, 1966        W. F. DE BOICE        3,226,979
CAPACITIVE PICKOFF UNBALANCE DETECTOR AND ENCODER CIRCUIT
Filed April 2, 1962        4 Sheets-Sheet 3

INVENTOR.
WILLIAM F. DEBOICE
BY Sidney Magnes
AGENT

INVENTOR.
WILLIAM F. DE BOICE
BY Sidney Magnes
AGENT

United States Patent Office 3,226,979
Patented Jan. 4, 1966

3,226,979
CAPACITIVE PICKOFF UNBALANCE DETECTOR AND ENCODER CIRCUIT
William F. De Boice, Long Beach, Calif., assignor to North American Aviation, Inc.
Filed Apr. 2, 1962, Ser. No. 184,126
3 Claims. (Cl. 73—517)

This invention relates to pickoff circuitry; and more particularly to circuitry for (1) detecting the displacement of a pickoff element from its normal position, (2) restoring the pickoff element to its normal position, (3) and/or measuring the amount and direction the pickoff element is displaced from its normal position.

"Pickoff" devices are frequently used to indicate deviations from a desired state. For example it may be necessary to know whether the level of a liquid in a tank is correct; whether the temperature at a particular point is too high or too low; or whether the proof-mass of an accelerometer has moved from its normal position.

The pickoff device generally produces an electrical signal that is indicative of its state. Since much present day apparatus is associated with computers, it is highly desirable that the output of the pickoff circuit be in a form that can be applied directly to a computer, without the need for passing through converters.

For convenience of explanation, the operation of my invention will be disclosed in terms of an accelerometer, although it will be obvious from the foregoing examples that my invention may be used in many other applications.

It is therefore the principal object of my invention to provide an improved pickoff circuit.

It is another object of my invention to provide a pickoff circuit that indicates the direction of displacement of the pickoff element.

It is a further object of my invention to provide a pickoff circuit that provides information useful for restoring the pickoff element to its normal position.

It is still another object of my invention to provide a pickoff circuit whose output is in a form that is suitable for computer use.

It is still another object of my invention to provide a pickoff circuit that automatically measures both the amount and direction of the pickoff element's displacement.

The attainment of these objects and others will be realized from the following specification, taken in conjunction with the drawings of which FIGURE 1 is a schematic circuit showing the basic concept of my invention;

FIGURE 2 is a plurality of waveforms associated with my invention;

FIGURE 4 is a schematic representation of a pickoff device embodying my invention;

FIGURES 5 and 6 are waveforms associated with the circuitry of FIGURE 3;

FIGURE 8 is a schematic diagram showing an improvement to my basic circuit.

Broadly stated, my invention causes displacement of the pickoff element to drive a bi-stable circuit into one of its stable states; the particular state indicating the direction of displacement. Since the output of the bi-stable circuit indicates the direction of displacement, I apply this output to an actuating circuit that restores the element to its normal position. The output signal associated with the actuating circuit is of a type that may be applied directly to a computer.

My invention may also be used in conjunction with logic circuitry that measures the amount and direction of displacement.

Figure 1:
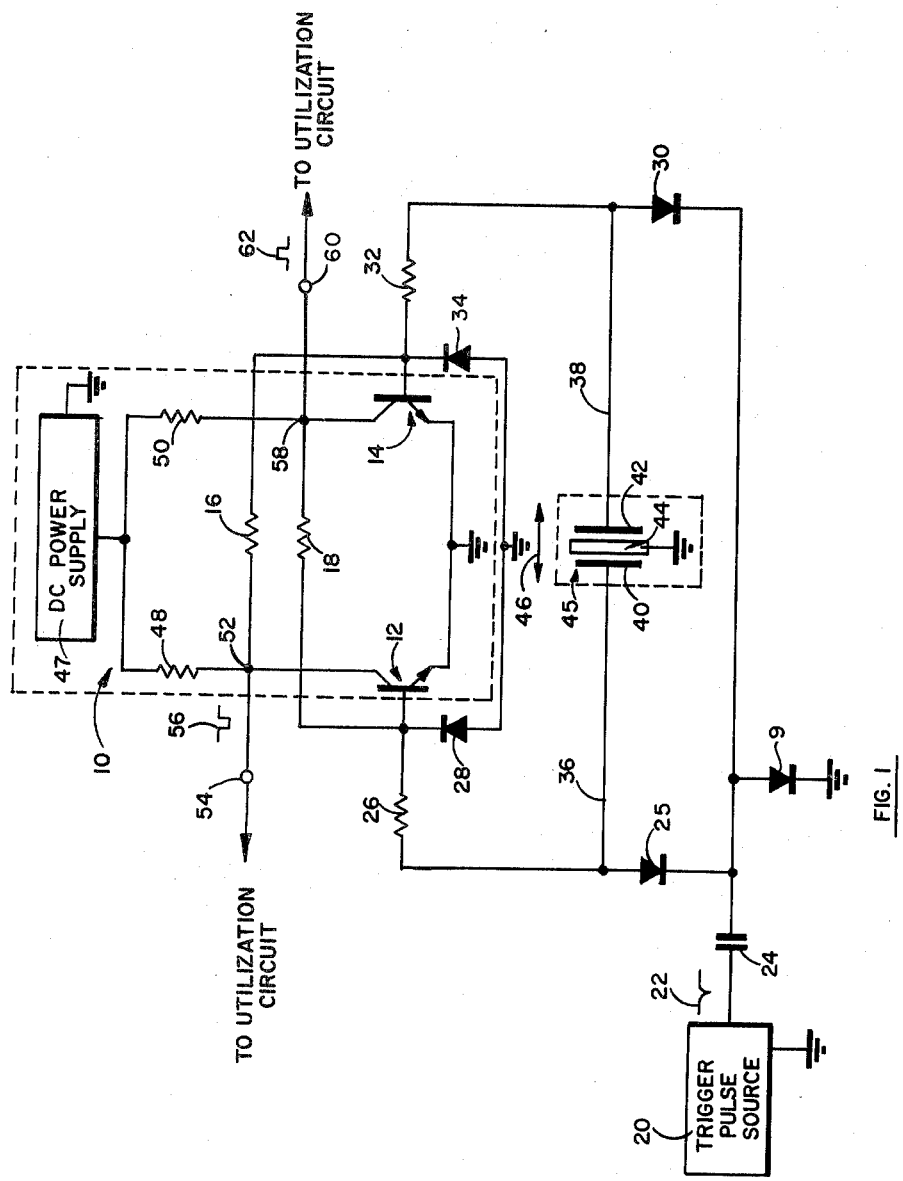

My basic inventive concept will be understood from FIGURE 1, wherein it is desired to sense the position of a movable reed 44 of a pickoff device 45.

My circuit uses a bi-stable arrangement having the characteristic that, when operative, it will flip to one or the other of two stable states. Many types of flip-flop configurations are known; these including electronic circuits, relays, and the like. FIGURE 1 illustrates a transistorized version. The illustrated flip-flop 10 comprises two transistors, 12 and 14, interconnected by resistances 16 and 18 in such a way that if one transistor becomes even slightly conductive the circuit "flips" to the state wherein that transistor becomes fully conductive while the other transistor is cutoff, or non-conductive. If for some reason the other transistor had become conductive first, the flip-flop circuit would have "flopped" to its other state, wherein the second transistor is fully conductive, while the first is cutoff from conductivity. With the above brief description in mind, the operation of my invention can now be preesnted.

To start the operation, trigger pulse source 20 produces a short-duration triggering pulse 22. Triggering pulse 22 is shown as negative-going (pointing downward) because of the type and circuit configuration of the transistors used in the flip-flop; although other type of transistors and configurations might require a triggering pulse of a different polarity. Trigger pulse 22 traverses coupling capacitance 24, polarity-control diode 25, resistance 26, and protective diode 28; meanwhile applying a negative cutoff potential to the base electrode of transistor 12. This negative potential disables transistor 12, so that it does not conduct.

Simultaneously, trigger pulse 22 also traverses polarity-control diode 30, resistance 32, and protective diode 34; meanwhile applying a negative cut-off potential to the base electrode of transistor 14. Thus transistor 14 is also disabled.

In summary, a triggering pulse disables both transistors 12 and 14 so that neither conduct; and this disabling effect lasts for the duration of trigger pulse 22.

In order to assure reliable disabling of the flip-flop, trigger pulse 22 preferably has a high magnitude. Since a high-magnitude trigger pulse may injure the transistors, protective diodes 28 and 34 are inserted into the circuit; their function being to limit the negative potential actually applied to the base electrode of transistors 12 and 14.

Simultaneously with the previously described disabling action, trigger pulse 22 also traverses leads 36 and 38, and applies negative charges to pickoff plates 40 and 42, which are spaced from, and therefore capacitively coupled to, reed 44 of pickoff device 45. The apparatus is now primed for operation.

Reed 44 can move backwards and forwards as indicated by the double-ended arrow 46; and would move in one direction or the other depending upon the level of the liquid, the temperature, or the displacement caused by acceleration.

Assume that the reed 44 has been displaced in one direction or the other; and it desired to sense the direction of displacement. If reed 44 had been displaced to the right, it would be closer to pickoff plate 42 than to pickoff plate 40, and this close spacing means that there is a high capacitance between reed 44 and pickoff plate 42. The electrical charge stored on pickoff plate 40 by the trigger pulse can leak off more quickly from plate 40 than it can from pickoff plate 42. As a result, the more rapid leakage of the negative charge from pickoff plate 40 permits the potential at the base electrode of transistor 12 to rise more rapidly than at the base electrode of transistor 14. Thus, transistor 12 becomes conductive before transistor 14 does, and the inherent action of flip-flop 10 causes transistor 12 to become fully conductive, while transistor 14 becomes fully cutoff or non-conductive.

It will be seen that current flows from the D.C. power supply 47 through load resistance 48 and the now-conductive transistor 12; and the IR drop through load resistance 48 causes junction 52 to assume a relatively low potential, which in turn appears at output terminal 54 as a negative-going signal 56.

During this time transistor 14 has been non-conductive, and no current has flown through its load resistance 50. As a result, junction 58 remains at a relatively high potential; thus applying to output terminal 60 a high potential indicated symbolically by positive-going waveform 62.

It may thus be seen that if reed 44 were closer to pickoff plate 42 for any reason whatsoever, the output at terminal 54 would be negative-going, while the output at terminal 60 would be positive-going.

If on the other hand, reed 44 were closer to pickoff plate 40, the positions of the waveforms would be interchanged.

My invention thus senses the direction of displacement, and produces waveforms whose polarity, or magnitude, is an indication of the position of the reed 44. Moreover, it will also be noted that the output waveforms are "binary," since they have one of two possible magnitudes; rather than being "analog" where the magnitude of the output waveform has a plurality of different levels. Since computers require binary signals, the outputs from my circuit may be applied directly to the computers without having to pass thru converters.

In order to cyclically sense the displacement, which may change from one moment to the next, the next trigger pulse disables both transistors, 12 and 14, as previously explained. This means that no current flows through load resistance 48, or through load resistance 50. As a result the output waveforms 56 and 62 both return to their normal levels.

Upon the disappearance of the second triggering pulse, the previously described sensing action is repeated, and output terminals 54 and 60 each produce another waveform that depends upon the instantaneous position of reed 44.

FIGURE 2 shows the relation between the displacement and the output waveforms. If reed 44 is displaced to the right, the output waveforms 56A and 62A would appear as shown in the left half of FIGURE 2; waveform 22A showing the trigger pulses during which the flip-flop is disabled. If the reed 44 moves to the left, waveforms 56B and 62B would appear as shown on the right hand portions of FIGURE 2.

Well known circuits indicate whether the reed had moved to the right or to the left by noting the polarities and levels of the waveforms from the output terminals 54 and 60.

It is therefore apparent that my invention can be used to periodically sense the position of a pickoff element; and that the output signal is of the binary form that may be fed directly to a computer or to some other utilization device.

While the mere indicating operation of my invention as thus far described may be satisfactory in some cases, it is frequently desirable that a restoring force be produced to overcome the displacement of the reed.

Figure 3:
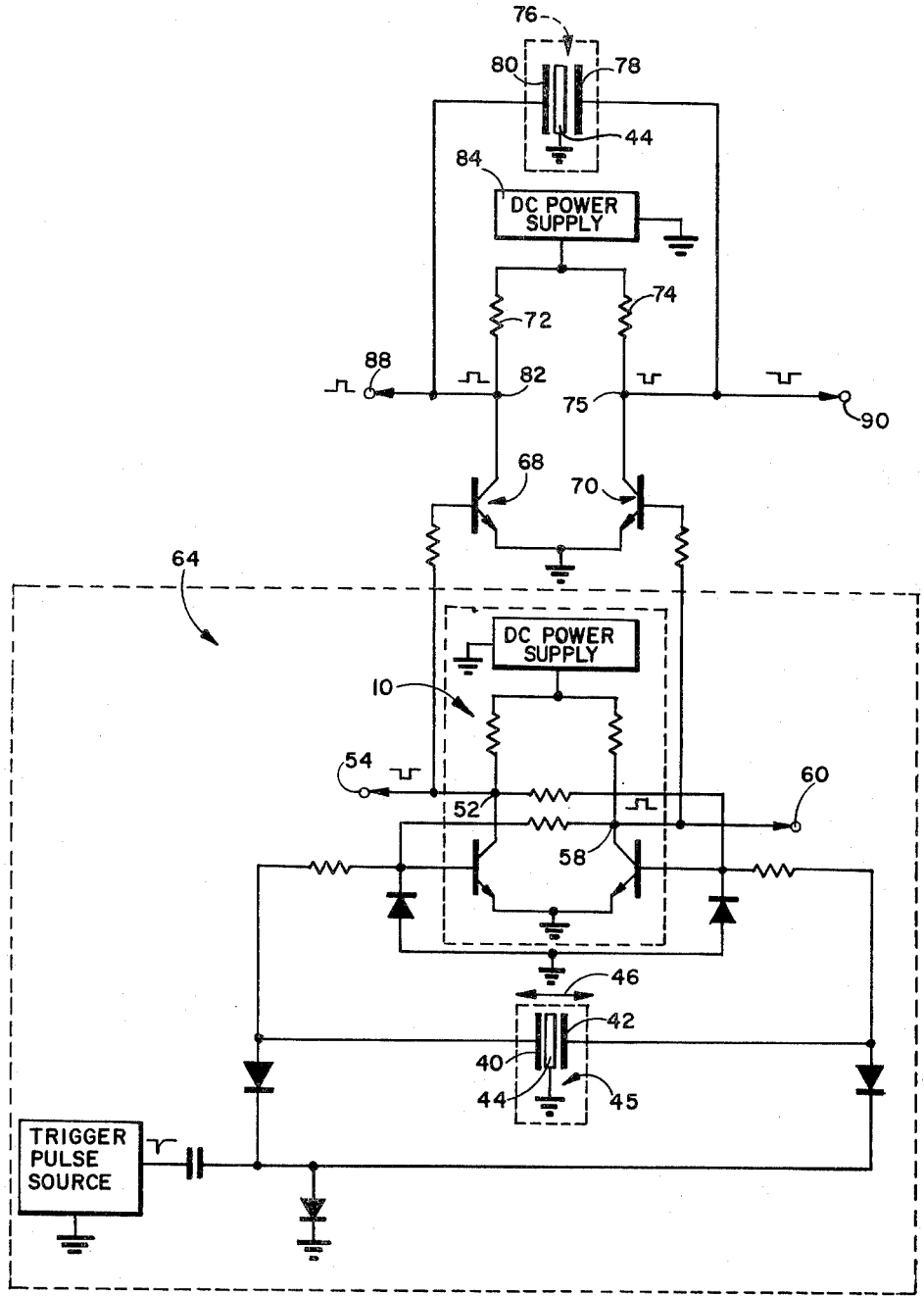
FIGURE 3 is a schematic diagram showing the application of my circuit to a restoring arrangement.

FIGURE 3 shows how this may be accomplished. The circuit in the lower half of FIGURE 3, in dashed-line block 64, is the same as previously described; and therefore the explanation of its operation will not be repeated.

The following discussion will therefore be directed primarily to the utilization arrangement for producing a restoring force.

It will be recalled that if reed 44 were displaced to the right, the output at junction 52 would be a negative-going signal, while the output at junction 58 would be a positive-going signal. These signals are applied to a pair of buffer amplifiers 68 and 70; the application of these potentials to the base electrodes of transistors 68 and 70 causing transistor 68 to be completely cutoff while transistor 70 becomes fully conductive.

The current flowing from power supply 84 thru load resistance 74 to now-conductive transistor 70 causes the potential at junction 75 to drop to practically zero level. The zero-level potential is applied to actuator plate 78 of actuator 76; whose operation will be fully disclosed hereinafter. Simultaneously, since transistor 68 is cut off, the absence of current through load resistance 72 causes junction 82 to remain at the relatively high potential of the D.C. supply 84. This high potential is applied to actuator plate 80 of actuator 76.

An exemplary physical arrangement is shown in FIGURE 4, which shows a reed 44 supported-cantilever-style, from a frame 86. The pickoff 45, a pair of pickoff plates 40, 42, straddling reed 44; and the actuating device 76 comprises a pair of actuator plates 78, 80, that also straddle the reed 44. As reed 44 is displaced to the left or the right, its displacement causes it to be closer to one of the pickoff plates 40 or 42 as described in connection with FIGURE 1; and closer to one of the actuating plates 78 or 80 as described in connection with FIGURE 3.

The action of the restoring force will be understood by referring once more to FIGURE 3. It may be seen that reed 44 is at ground potential, and has been assumed to be displaced to the right, so that it is physically farther from actuating plate 80 (which is at a relatively high potential) than from actuating plate 78 (which is at substantially ground potential). The electrostatic attraction between reed 44 and actuating plate 78 is practically zero, since both of them are at substantially the same potential. However, the electrostatic attraction between actuating plate 80 and reed 44 is quite great, because practically the entire potential of D.C. supply 84 is applied between them. As a result, reed 44 is attracted toward actuating plate 80; this force of attraction being such as to restore the reed to its center position.

The operation to this point may be summarized as follows. When for one reason or another, reed 44 is displaced, flip-flop 10 produces two output signals whose relative polarities indicate the direction of the displacement. Simultaneously, these output signals are applied to a pair of buffer amplifiers that produce an electrostatic field that tends to restore the reed to its center position.

A periodic operation is produced as follows. A second trigger pulse is introduced into the system. This disables the entire system momentarily, after which the system's operation again indicates the reed's position, and tends to restore it to its central position. Thus, my circuit periodically senses the displacement of the reed; and the utilization portion corrects for its displacement.

The output signals may be understood by assuming that for some reason, such as acceleration, reed 44 is being strongly displaced to the right. The operation of my invention is such that the displacement is periodically sensed; and a pull to the left is exerted, this pull being associated with a positive-going signal at output terminal 88.

Had the reed been displaced to the left, the pull would have been to the right; and would be associated with a positive-going signal at output terminal 90. It may thus be seen that the presence of positive-going signals at the output terminals are an indication of the pulls compensating for the reed's displacement.

If reed 44 were being strongly forced to the right by a constant acceleration, this condition would result in the waveform of FIGURE 5, here waveform 88A represents the output signals at output terminal 88, and waveform 90A represents the output signals at output terminal 90; waveform 22A again representing the trigger pulses.

It will be noted that waveform 88A has seven positive-going portions, whereas waveform 90A has only three positive-going portions. The waveforms indicate that the reed's displacement to the right was so large that it required two pulls to bring it back to, or slightly beyond, its normal position. During the next sensing cycle it is pulled rightward of its normal position. At the fourth cycle the reed has again been displaced so far to the right that it again requires two pulls to restore it to its normal position.

It may thus be seen that the difference between the number of positive-going waveforms produced at the other output terminal is a measure of the direction and amount of restoring force applied to the reed 44.

If reed 44 were in its central, or normal position, the operation of the circuit is such that there would be an equal number of pulls to the left and to the right. This may be seen in FIGURE 6, wherein waveform 22A again represents the trigger pulses applied to the system, waveform 88B represents the output signals obtained from output terminal 88, and waveform 90B represents the output signals obtained from output terminal 90. It may be seen that waveforms 88B and 90B each have five positive-going portions. This would means that there are just as many pulls to the left as there are to the right; in other words that the reed is dithering about its normal position.

It may thus be seen that if the reed should be forced in one direction or the other, the polarity of the output signals would indicate this fact; and the actuating restoring action would act to restore the reed to its normal position.

While it is possible to obtain the actuating signals from flip-flop 10, there is a possibility that the extra load on this circuit may affect its operation. I therefore prefer to obtain the actuating signals from the buffer amplifiers, which may be designed to have sufficient power to operate the actuator 76, and to also supply output signals for subsequent equipment.

Figure 7:
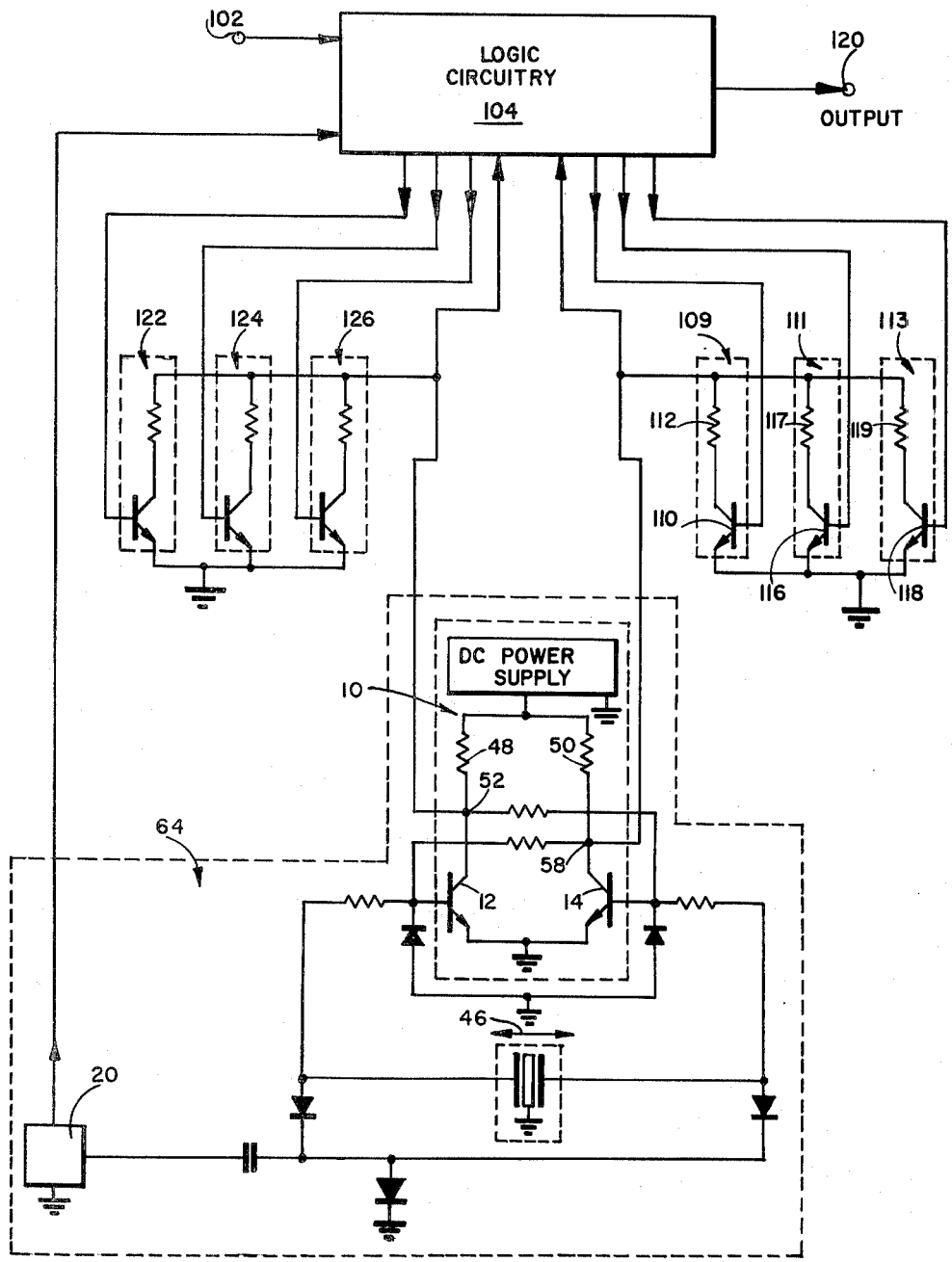
FIGURE 7 is a schematic diagram of my invention as used in conjunction with circuitry for indicating the magnitude and direction of displacement.

Under some conditions it may be desirable to quickly and accurately measure both the direction and displacement of the reed 44, with or without restoring it to its normal position; and the utilization circuit shown in FIGURE 7 is one way to accomplish this result. My basic inventive concept is again shown in dashed-line block 64.

In this arrangement a starting signal is applied to an input terminal 102 of a logic circuit 104. The starting signal initiates operation as previously described, except that in this case the outputs at junctions 52 and 58 are applied to the logic circuit 104 which senses the direction of displacement of the reed. Assuming again that the sensing operation indicates that the reed is displaced to the right, logic circuit 104 activates a compensating circuit 109 comprising transistor 110 and load resistance 112. The compensating circuit is such that its load resistance 112 and load resistance 50 forms a composite load. Thus, logic circuit 104 decreases the ability of flip-flop 10 to detect displacements to the right. On the next cycle, the operation of the flip-flop is slightly different because of its decreased sensitivity. As a result transistor 12 becomes conductive a little later than previously. Logic circuit 104 recognizes this, and realizes that the addition of load resistance 112 has not been quite enough to establish the condition wherein transistors 12 and 14 begin to conduct at the same instant.

Logic circuit 104 therefore adds, or substitutes, a second compensating circuit 111, comprising transistor 116 and a different-valued load resistance 117. If this composite load does not accomplish the desired result as shown by the next sensing cycle, the logic circuit then uses another compensating circuit 113, comprising transistor 118 and load resistance 119, in an attempt to perfectly balance the operation of transistors 12 and 14.

Logic circuit 104 thus cyclically tests the outputs 52 and 58 and inserts compensating circuits to produce the condition wherein both transistors of the flip-flop become conductive at the same instant. When this condition is achieved, or the switching program is completed, logic circuit 104 indicates at its output terminal 120 which compensating circuits were used; thus indicating the direction and magnitude of the displacement.

Had the displacement been in the opposite direction, logic circuit 104 would have used the compensating circuits 122–124 and 126, either singly or in combination, to achieve balance. Briefly summarized, it may be said that the logic circuit controls the operation sensitivity of the flip-flop.

It may now be realized that my invention will not only sense the displacement, and if desired, correct it; but may also be used to measure the magnitude and direction of the displacement; and to transmit this information to subsequent equipment.

Referring back once more to FIGURE 1 it will be recalled that transistors 12 or 14 become conductive when the potential applied to their base electrodes became positive enough to permit conductivity. This occured when the negative charge stored on a pickoff plate had dissipated itself through the capacitance between the plate and the reed, the resistance, and the diode. Since transistors are not precisely reproduceable, or consistent in their operation, this portion of the circuit may be improved as shown in FIGURE 8.

Here tunnel diodes 128 and resistances 130 are used in such a way that when the potential applied to the base electrode of the transistor reaches a predetermined value, the characteristic operation of the tunnel diode causes the voltage to increase abruptly; thus assuring that transistors 12 and 14 will become conductive at a point determined by the circuit formed by the tunnel diode and resistances 130, rather than at a point determined by the construction of the transistor itself.

Although the invenion has been described and illustrated in detail, it is to be understood that the same is by way of illustration and example only and is not to be taken by way of limitation, the spirit and scope of this invention being limited only by the terms of the appended claims.

I claim:

1. An acceleration sensing device responsive to applied accelerations for producing an electrical output signal representative of the amplitude and polarity of the accelerations, said device comprising:
   a conductive reed means substantially stationary in a null position in the absence of applied accelerations and moveable therefrom in either direction along a sensitive axis in response to accelerations applied along said axis;
   a pair of substantially parallel conductive plates positioned on each side of said reed means so as to form therewith a first and second variable capacitor, said reed being a common plate the movement of which causes the capacitance between said first and second capacitors to vary;
   pulse means connected between said reed means and said plates for applying a periodic voltage pulse to said plates to charge said capacitors to a value dependent upon the position of said reed means;
   a bistable means for producing a signal of a first state when the charge on said first capacitor is greater than the charge on said second capacitor and for producing a signal of a second state when the charge on said second capacitor is larger than the charge on said first capacitor, said bistable means being periodically disabled from sensing said charges by said pulse means, whereby the state of said bistable means indicates the polarity of said sensed accelerations and the duration of said states indicates the magnitude of said sensed accelerations.

2. In an acceleration sensing device for sensing the amplitude and polarity of accelerations applied along a predetermined sensing axis, the combination comprising:
    a conductive reed means substantially stationary in a null position in the absence of applied accelerations and moveable therefrom in either direction in response to accelerations applied along said axis;
    a first pair of substantially parallel conductive plates positioned on each side of said reed means so as to form therewith a first and second variable capacitor, said reed being a common plate the movement of which causes the capacitance between said first and second capactiors to vary;
    a second pair of substantially parallel conductive plates positioned adjacent to said first pair of plates;
    pulse means connected between said reed means and said first plates for applying a periodic voltage pulse to said plates to charge said capacitors to a value dependent upon the position of said reed means;
    a bistable means for producing a signal of a first state when the charge on said first capacitor is greater than the charge on said second capacitor and for producing a signal of a second state when the charge on said second capacitor is larger than the charge on said first capacitor, said bistable means being periodically disabled from sensing said charges by said pulse means;
    amplifier means connected between said bistable means and said second pair of plates, for sensing the state of said bistable means and applying a voltage to said second plates of such a polarity and amplitude as to generate an electrostatic force to counter said sensed acceleration and null said reed means, whereby said voltage is an indication of the polarity and amplitude of said sensed acceleration.

3. The device as claimed in claim 2 wherein said bistable means comprises:
    a first and second transistor each having a base, an emitter and a collector electrode;
    a common terminal;
    a voltage source connected between said common terminal and the collectors of said first and second transistors by a first and second load resistor respectively;
    a third resistor connecting the base of said first transistor to the collector of said second transistor, and a fourth resistor connecting the base of said second transistor to the collector of said first transistor;
    a fifth resistor connecting the base of said first transistor to a first diode, a sixth resistor connecting the base of said second transistor to a second diode, said first and second diodes serially connecting the bases of said first and second transistors; a third and fourth diode connected from said common point to the base of said first and second transistors respectively;
    a first and second output terminal conductively connected to the collectors of said first and second transistors respectively, the emitters of said first and second transistors being conductively connected to said common terminal;
    said first capacitor plate being connected to the junction of said fourth resistor and said first diode, said second capacitor plate being connected to the junction of said fifth resistor and said second diode.

References Cited by the Examiner

UNITED STATES PATENTS

| | | | |
|---|---|---|---|
| 2,380,520 | 7/1945 | Hassler | 328—196 |
| 2,903,606 | 9/1959 | Curtis | 307—88.5 |
| 2,916,279 | 12/1959 | Stanton | 73—517 |
| 2,940,306 | 6/1960 | Lozier | 73—71.2 |
| 2,968,031 | 1/1961 | Higo | 324—83 X |
| 2,968,952 | 1/1961 | Stalder | 73—517 |
| 2,974,238 | 3/1961 | Lohman | 307—88.5 |
| 2,982,870 | 5/1961 | Hilbiber | 307—88.5 |
| 3,062,059 | 11/1962 | Singleton | 73—517 |
| 3,084,558 | 4/1963 | Wilcox | 324—61 X |
| 3,131,564 | 5/1964 | Romberg | 73—517 |

RICHARD C. QUEISSER, *Primary Examiner.*

W. L. CARLSON, *Examiner.*